March 28, 1950 P. E. HAWKINS 2,502,007
TRUCK BRAKE
Filed Dec. 1, 1944 5 Sheets-Sheet 1
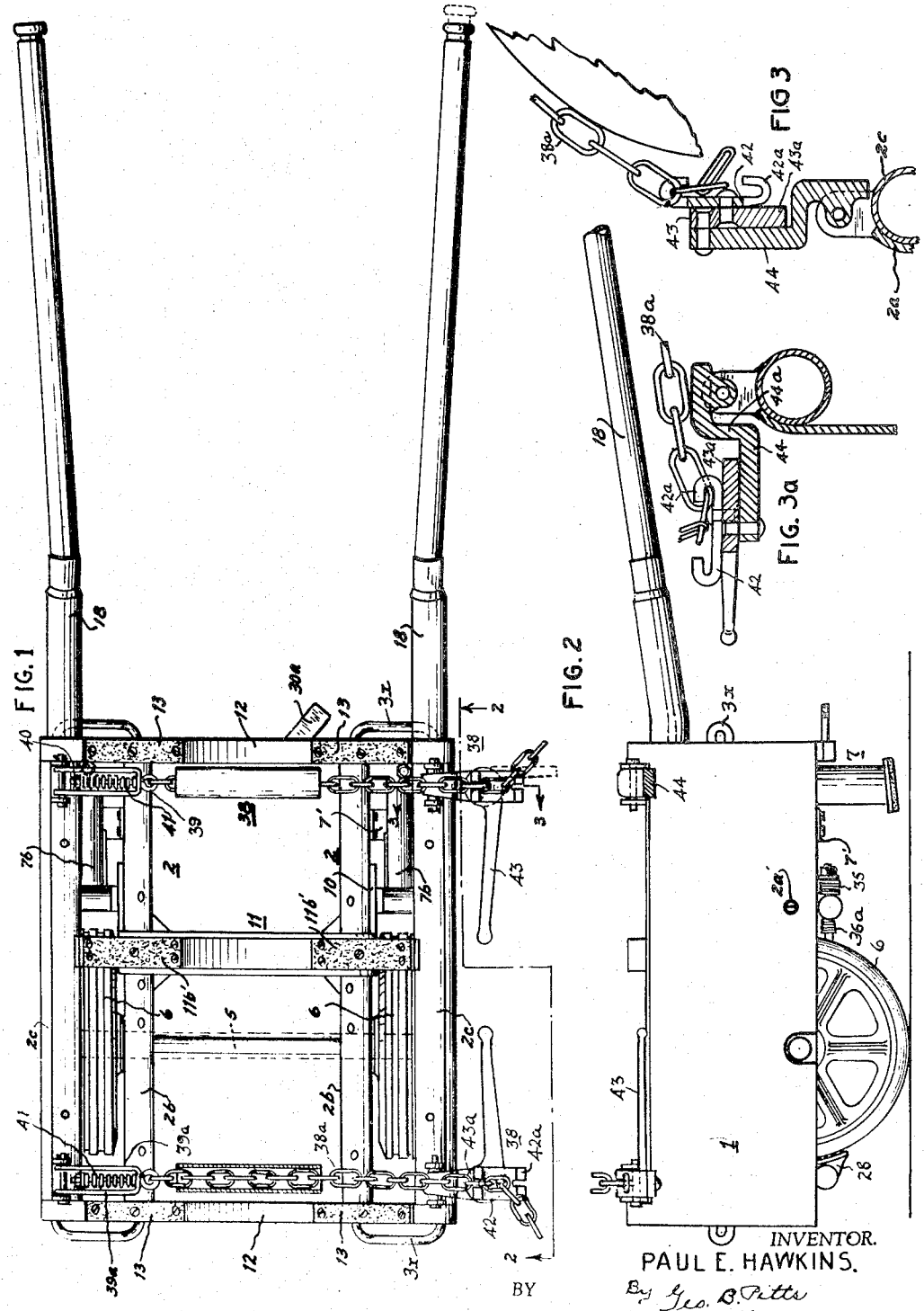
INVENTOR.
PAUL E. HAWKINS.
By Geo. B. Pitts
attorney

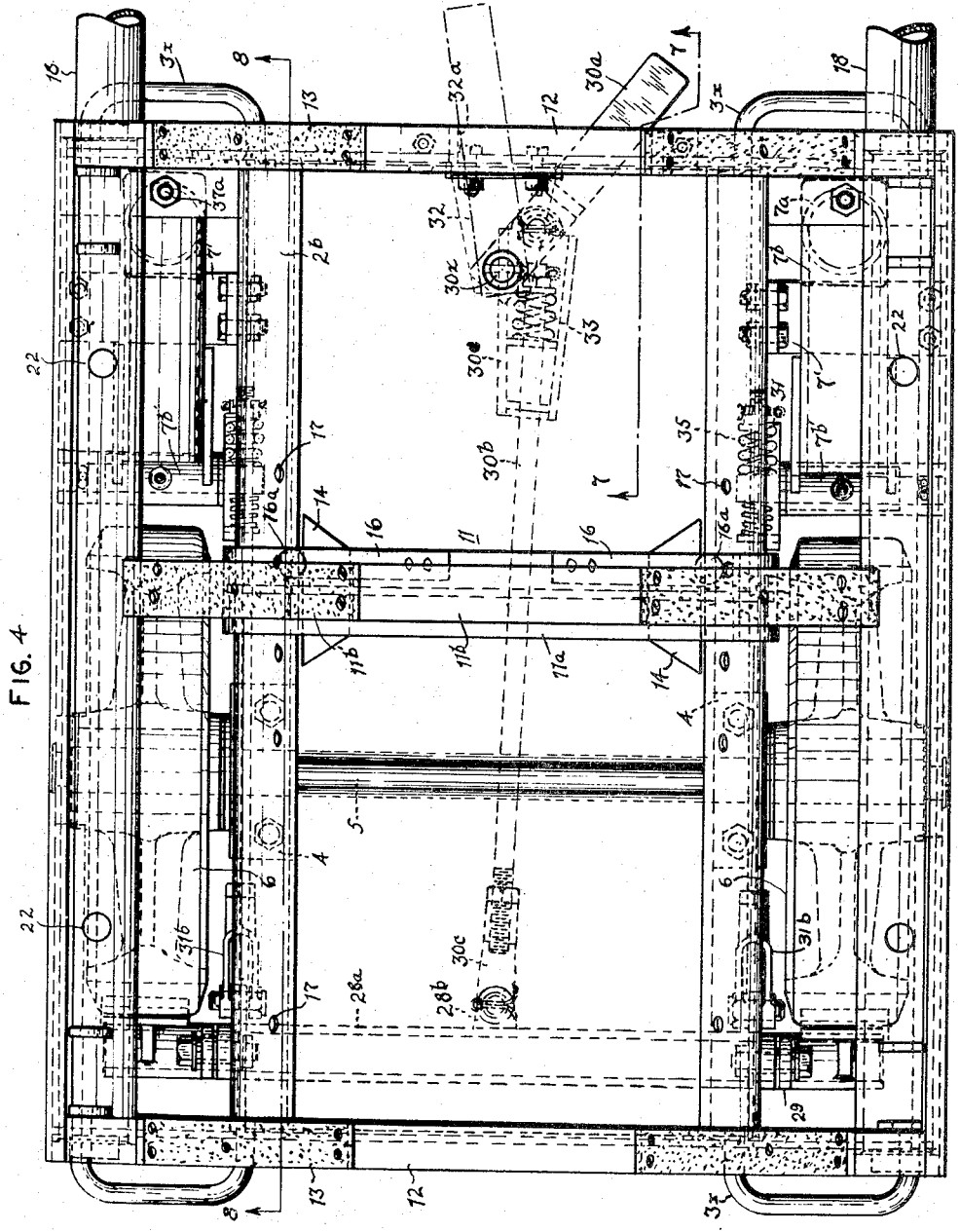

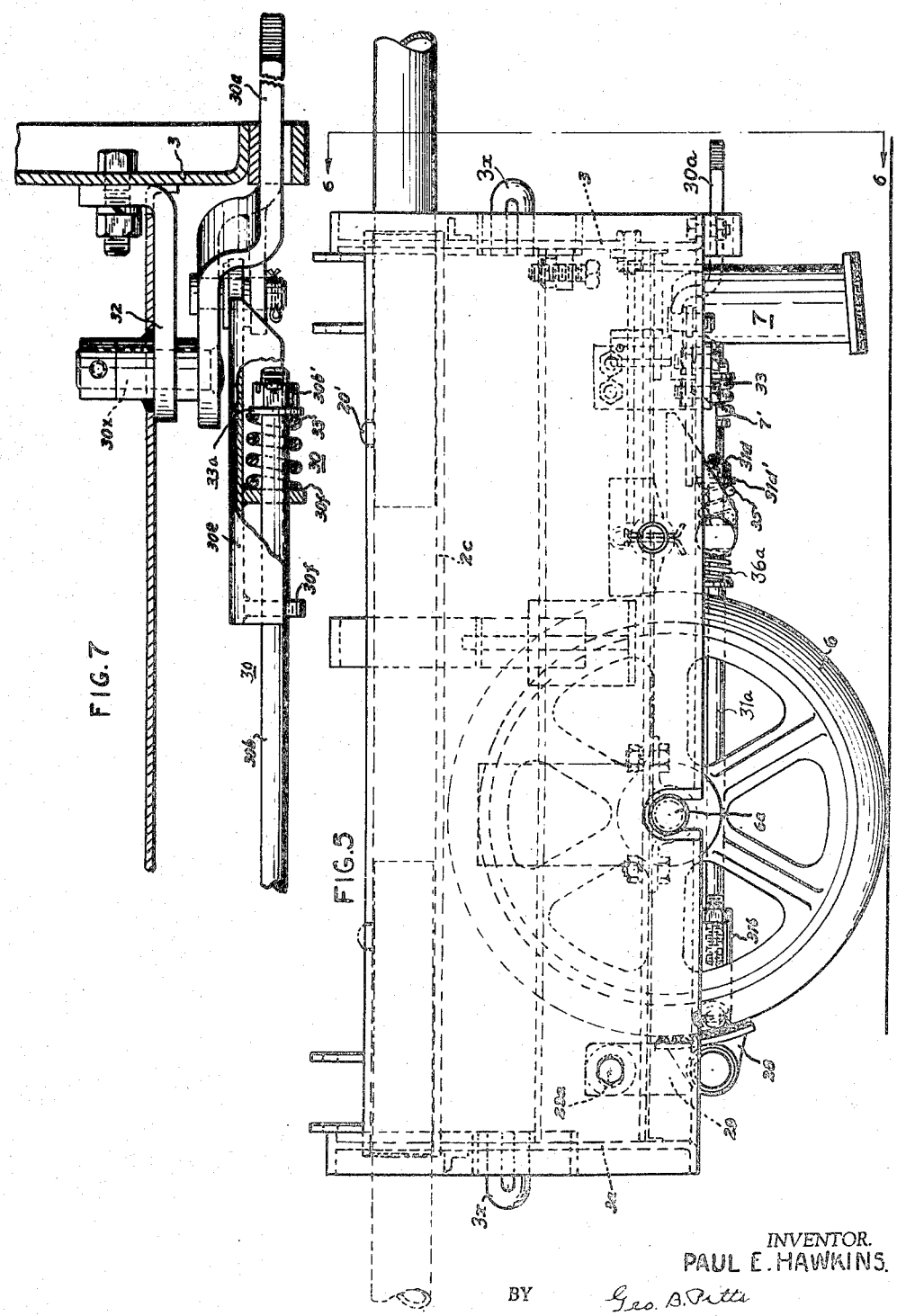

March 28, 1950     P. E. HAWKINS     2,502,007
TRUCK BRAKE
Filed Dec. 1, 1944     5 Sheets—Sheet 4
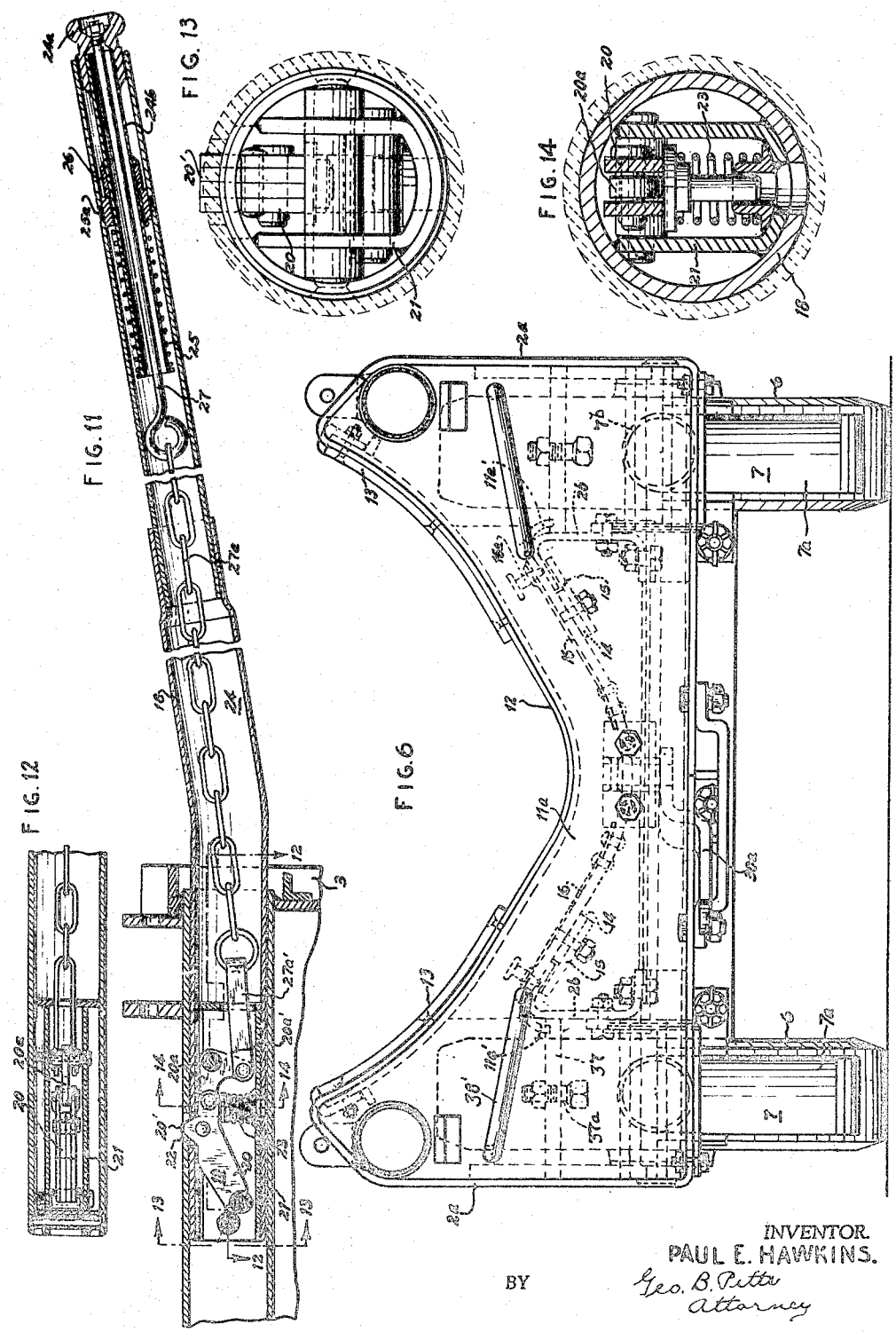
INVENTOR.
PAUL E. HAWKINS.
BY Geo. B. Pitts
Attorney March 28, 1950 P. E. HAWKINS 2,502,007
TRUCK BRAKE
Filed Dec. 1, 1944 5 Sheets-Sheet 5
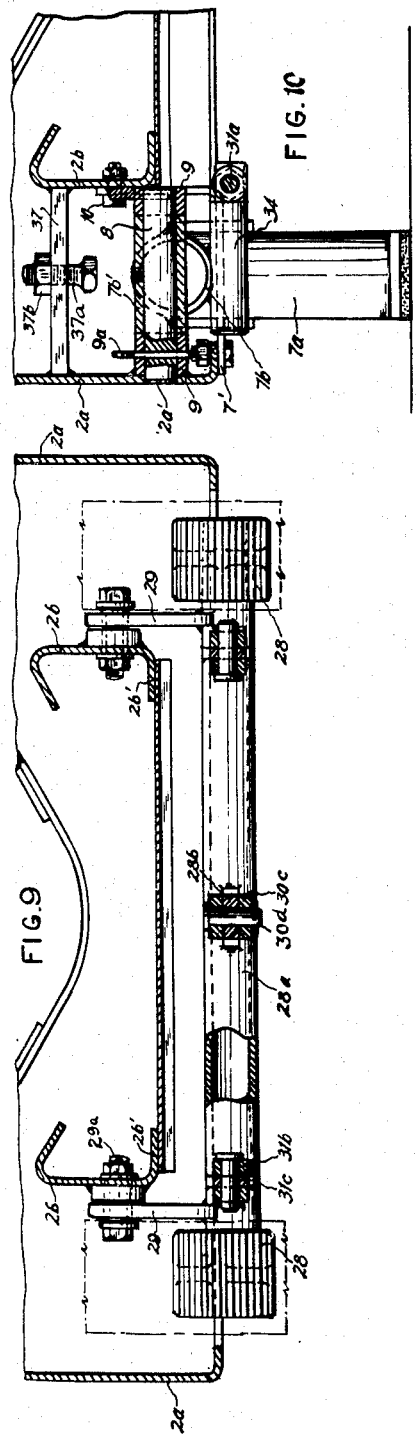
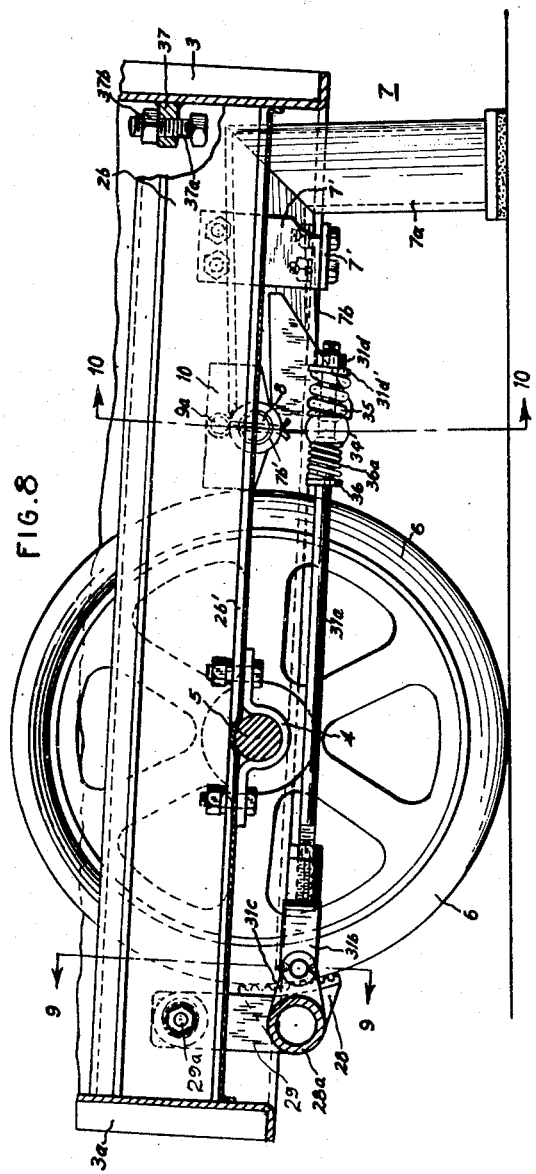
INVENTOR.
PAUL E. HAWKINS.
BY Geo. B. Pitts
Attorney Patented Mar. 28, 1950

2,502,007

UNITED STATES PATENT OFFICE 2,502,007

TRUCK BRAKE

Paul E. Hawkins, Lakewood, Ohio, assignor to The Baker-Raulang Company, Cleveland, Ohio, a corporation of Ohio Application December 1, 1944, Serial No. 566,045

9 Claims. (Cl. 188—176)

This invention relates to a hand truck of the push and pull type for supporting and transporting a body or bodies from place to place. The frame of the truck has been designated to carry a body having curvilinear exterior walls, such as a bomb and/or a torpedo. In such application of the invention, the truck may be loaded at the place of storage of these bodies and then wheeled (pushed or pulled) to a convenient location for transfer to the vehicle (for example, an airplane) which is to be used to carry the body to its destination; that is, in the case of a bomb or torpedo, over a designated target.

In actual use, a large number of these trucks may be loaded and wheeled to and assembled in a designated area, in side-by-side and end-to-end relation, ready to be relieved of their loads. To insure maximum efficiency the truck is of the two wheel type to minimize its length and number of movable parts, whereby repairs and replacements of parts are substantially eliminated.

One object of the invention therefore is to provide an improved two wheeled truck having a skeleton frame the structural elements of which are fabricated to support and carry ponderous bodies and withstand rough usage when handled.

Another object of the invention is to construct an improved wheel mounted truck the structural elements of which are fabricated to provide mountings for removable handle at opposite ends of the truck frame.

Another object of the invention is to provide in a wheel mounted truck having a handle, improved detachable connections between the handle and frame of the truck.

Another object of the invention is to provide in a wheel mounted truck an improved brake mechanism adapted to be controlled by the tilting of the truck frame.

Another object of the invention is to provide an improved truck of the two-wheel supported type having a brake mechanism for the wheels and a depending member at one end of the truck frame operatively connected to the brake mechanism for operating the latter due to engagement of the member with the ground or other surface.

Another object of the invention is to provide an improved truck of the two-wheel type having a brake mechanism for the wheels and a supporting standard movably mounted at one end of the truck frame operatively connected to the brake mechanism, the standard being arranged to cooperate with the truck wheels to support the truck frame when the latter is tilted and simultaneously operate the brake mechanism due to the engagement of the standard with the ground or other surface as tilting of the frame takes place.

Another object of the invention is to provide an improved truck of the two-wheel type having brake shoes for the wheels, manually operated connections for operating the brake shoes and separate operating connections for the brake shoes controlled by the tilting of the truck frame.

Other objects of the invention will be apparent to those skilled in the art to which my invention relates from the following description taken in connection with the accompanying drawings, wherein Fig. 1 is a plan view of a truck embodying my invention.

Fig. 2 is a side elevation, on the line 2—2 of Fig. 1.

Fig. 3 is a fragmentary section on the line 3—3 of Fig. 1.

Fig. 3a is a view similar to Fig. 3, but showing the parts in clamping position.

Fig. 4 is a plan view of the truck (enlarged), the push-and-pull handles being broken away and clamping means being omitted.

Fig. 5 is a side elevation (enlarged).

Fig. 6 is a section on the line 6—6 of Fig. 5.

Fig. 7 is a fragmentary section on the line 7—7 of Fig. 4.

Fig. 8 is a section on the line 8—8 of Fig. 4, but showing the front end of the frame supported on its standards, parts being broken away.

Figs. 9 and 10 are sections on the line 9—9 and 10—10, respectively, of Fig. 8.

Fig. 11 is a longitudinal section of one of the handles showing its mounting in the truck frame.

Figs. 12, 13 and 14 are sections on the lines 12—12, 13—13, and 14—14, respectively, of Fig. 11.

In the drawings, 1 indicates as an entirety a truck frame or chassis comprising spaced side members 2, 2, the opposite ends of which are suitably connected to front and rear flanged cross plates 3, 3a. Each side member 2 consists of an outer side plate 2a, an inner channel element 2b and a tubular member 2c on the inner side of the plate 2a adjacent its upper end, these parts being welded to the cross plates 3, 3a. As these parts forming each side member are disposed in spaced relation and rigidly connected to the front and rear cross plates 3, 3a, the truck frame 1 is both unitary and rigid and thus capable of carrying a ponderous body and withstanding rough handling and knocks without danger of breakage or distortion. The lower flanges 2b' of the side elements 2b are provided with straps 4, which engage an axle 5, each outer end portion of which between the adjacent plate 2a and element 2b supports a wheel 6. As shown in Figs. 4, 5 and 6, the side plates 2a are recessed to accommodate the cap 6a for the axle 5 so that parts of the wheel mounting do not protrude outwardly of the side plate 2a to permit parking and/or storing of the truck in close relation to other trucks. As shown, the axle 5 is mounted rearwardly of a transverse plane midway the end plates 3, 3a, so that the front end of the truck may gravitate when the truck is to be parked. The front end of the truck frame 1 is provided with a pair of standards 7 arranged to co-operate with the wheels 6 to support the frame in a substantially horizontal position (see Fig. 8). Each standard consists of a vertical leg 7a and a rearwardly extending horizontal arm 7b provided at its outer end with a sleeve 7b' which rotatably fits a shaft 8, whereby the standard is pivotally mounted on the frame 1, for a purpose later set forth. The opposite ends of the shaft 8 are supported in a pair of alined bushings or nipples 9, being locked to one thereof by a pin 9a. The outer bushing 9 is suitably welded to the inner wall of the adjacent plate 2a in registry with an opening 2a' formed therein to permit assembly of the shaft 8. The outer end of the inner bushing 9 is suitably welded to a plate 10, which in turn is welded to the side wall of the adjacent channel element 2b. An angle plate 7' suitably bolted at one end to the flange of each side plate 2a and at its opposite end to the side wall of the adjacent channel element 2b engages the arm 7b to support the adjacent standard and limits its downward movement when the frame 1 is in load carrying position (see Fig. 2).

The supporting means for the bomb or torpedo consist of spaced cross members to accommodate between them external devices required on the bomb or torpedo in handling it either to load or unload it with respect to the truck or its mounting in and release from an airplane. In the form of construction shown I utilize the upper ends of the end plates 3, 3a, and provide intermediate thereof a cross member, indicated as an entirety at 11, the opposite end portions of which are adjustably supported on the channel elements 2b for adjustment longitudinally thereof. The upper ends of the cross members are curved intermediate their opposite ends and each provided with a flanged reinforcing strip 12, which is suitably welded to the adjacent plate. Sections of suitable friction material 13 are riveted to the strip 12. The cross member 11 consists of an inverted T-section 11a to the upper edge of which is welded a metal strip 11b having a curvature corresponding to the strips 12. The opposite end portions of the strip 11b are extended beyond the ends of the T-section 11a so as to be coextensive with the strips 12 and these end portions are provided with sections of suitable friction material 11b'. The opposite ends of the T-section are slidably supported on the channel members 2b. As shown in dotted lines (see Fig. 6), the web of the T-section is cut away at its opposite ends so that its flange may be curved downwardly in relation to the outer sides of the channel members 2b, as shown at 11a' and co-operate with plates 14 related to the side edges of the channel elements 2b to guide the cross member 11 during adjustment thereof in either direction. The plates 14 are provided with plates 15 which extend outwardly below in overlapping relation to the upper flanges of the channel elements 2b to maintain the T-section 11a in engagement therewith. The flange of the T-section is provided with resilient metal strips 16, each riveted at its inner end to the flange and carrying at its outer end a pin 16a, these pins being arranged to be inserted in alined openings 17 formed in the channel elements 2b to lock the cross member in any adjusted position thereon.

18, 18, indicate handles (which are hollow for purposes later set forth) removably mounted at their inner ends in the truck frame. As shown, the tubular members 2c are open at their opposite ends and provide seats for the handles, whereby the handles may be mounted in or connected to either end of the truck frame. 19 indicates as an entirety interlocking means between the inner end of each handle and the wall of each tubular member 2c for detachably securing the handle in the latter. The means 19 comprise the following: 20, 20a, indicate a pair of links pivotally connected at their inner ends and pivotally supported at their outer ends between the side members of a frame 21, which is fixedly secured in the handle adjacent its inner end, the links 20, 20a forming a toggle. The link 20 is provided with an upwardly extending nose 20' which is adapted to extend through an opening formed in the wall of the handle and into an opening 22 formed in the tubular member 2c so as to engage the walls thereof and lock the handle to the tubular member. A spring 23 is provided between the bottom wall of the frame 21 and the link 20 and normally biases the latter upwardly to maintain the nose 20' in the adjacent opening 22. Due to the arrangement shown wherein the link 20 is normally biased upwardly, it will be observed that when a handle 18 is inserted into either end of a tubular member 2c, the nose 20' rides the wall of the latter until it registers with the adjacent opening 22 into which it projects automatically, thereby locking the handle against movement endwise in either direction. 24 indicates as an entirety means for releasing the detachable means 19 for each handle, whereby the latter may be removed. For this purpose the toggle link 20a is bell-crank shaped to provide an arm 20a' to which the release means 24 are connected. The release means 24 consist of the following: 24a indicates a grip member, the outer end of which extends outwardly of the handle 18. The inner end portion of the grip member 24a slidably fits the inner wall of the handle 18 and is fixed to the outer end of a tube 24b. The inner end of the tube 24b is provided with a flange which forms an abutment for the outer end of a spring 25 coiled around the tube 24b. The tube 24b slidably fits the inner wall of a collar 25a within and fixed to the wall of the handle 18 and co-operates with the inner wall of the handle to guide the grip member 24a and tube 24b, as well as to serve as an abutment for the inner end of the spring 25 which normally tends to slide the grip member 24a and tube 24b inwardly, such movement being limited by the engagement of a collar 26 on the tube 24b with the collar 25a. 27 indicates a rod extending through the tube 24b and adjustably fixed at its outer end to the grip member 24a, its inner end being connected by links (preferably in the form of a chain 27a and a strap 27a') to the arm 20a' of the toggle link 20a. From the foregoing description it will be observed that by pulling the grip member 24a outwardly against the tension of the spring 25, the toggle links 20, 20a, will be operated downwardly (as viewed in Fig. 11) to release or detach the nose 20' from the tubular member 2c and thereby permit removal of the handle 18.

28, 28, indicate a pair of brake shoes suitably fixed to the opposite ends of a hollow rod 28a swingably supported by a pair of links 29, which depend from and are pivotally mounted on stud shafts 29a extending laterally from the side walls of the channel elements 2b (see Figs. 8 and 9), adjacent the ends thereof remote from the standards 7. 30 indicates as an entirety operating connections between the rod 28a and a lever 30a, the manual operation of which applies the brake shoes 28 to the wheels 6 when the truck is to be parked or releases them therefrom and 31 indicates as an entirety operating connections between the rod 28a and each of the arms 7b of the standards 7 and arranged to operate as a service brake mechanism controlled by the engagement of the standards 7 with the ground or other surface and disengagement therefrom. The operating connections 30 consist of the following: 30b indicates a rod having adjustable connection at its outer end with the inner end of a link 30c, the outer end of which is bifurcated and fits over a lug 28b fixed to the rod 28a, the lug 28b and bifurcations of the link 30c being formed with alined openings to receive a pin 30d to pivotally connect the link 30c and rod 28a together. The inner end portion of the rod 30b is supported by a link 30e, the outer end of which is pivotally connected to the lever 30a. The inner end of the lever 30a is pivotally mounted at 30x on the outer end of a bracket 32 supported on and extending inwardly from the adjacent end plate 3 (see Fig. 7), the outer end portion of the lever extending outwardly beyond the end plate 3 to serve as a handle for operating the lever. The link 30e being pivoted to the lever 30a between its pivot 30x and handle portion, the link 30e is disposed at one side of an imaginary line which cuts the axes of the pivot 30x and pin 30d, when the brake shoes 28 are disengaged from the wheels 6, but when the lever 30a swings to the position shown in dotted lines (see Fig. 4) against a stop 32a, the effect of which is to apply the brake shoes 28 to the wheels 6, the link 30e is disposed on the opposite side of this imaginary line and locked in this position due to the pressure exerted by the shoes on the tires of the wheels 6. To supplement the resulting pressure between the brake shoes 28 and tires of the wheels or where the shoes engage drums on the wheels, I provide between the rod 30b and link 30e a spring 33 which is compressed when the lever 30a is operated to its brake applying position. As shown, the link 30e is provided with a pair of spaced transverse walls 30f formed with alined openings in which the rod 30b is slidably supported. The inner end of the rod 30b is provided with screw threads to take a nut 30b' to provide a wall for a collar 33a. As the spring 33 is interposed between the inner wall 30f and collar 33a, the spring will be compressed, when the lever 30a is operated to its brake applying position, to yieldingly lock the brake shoes in engagement with the wheels 6.

Each of the operating connections 31 consist of the following: 31a indicates a rod the outer end of which is adjustably connected to the inner end of a clevis 31b. The outer end of the clevis is pivotally connected to a lug 31c provided on the rod 28a. The inner end portion of the rod 31a extends through and loosely fits an opening formed in the end of a transverse supporting member 34 suitably fixed (preferably welded) to the lower side of the adjacent arm 7b (see Fig. 10), whereas the inner end of the rod 31a is provided with screw threads to take a nut 31d to support a collar or washer 31d' thereon. The supporting member 34 and collar 31d' form seats or abutments for a spring 35 which is coiled around the rod 31a. As the transverse supporting members 34 are carried by the arms 7b of the standards 7, which latter arms are pivoted to the frame 1, above the transverse members 34, it will be observed that when the frame is tilted to the position shown in Fig. 8, it moves relative to the standards 7 due to the engagement thereof with the ground or other surface, so that the standards swing or rock on the shafts 8, the effect of which is to move the transverse members 34 to the right (as viewed in Fig. 8) and transmit a thrust movement through the spring 35 to the rod 31a and apply the brake shoes 28. As the parts of the operating connections 31 (namely, clevises 31b, rods 31a, supporting members 34, springs 35 and nuts 31d) are adjusted and arranged, when the frame 1 is in load carrying position, to support the brake shoes in close relation to the wheels 6 (spaced therefrom approximately one-sixteenth of an inch), the movement of the frame 1 relative to the standards 7 where the latter engage the ground or other surface, is sufficient to effect a movement of the rods 31a and apply the brake shoes to the wheels 6. By preference each rod 31a inwardly of the adjacent transverse supporting member 34 is provided with a collar 36 and between the collar 36 and supporting member 34 is interposed a light coiled spring 36a, the purpose of which is to keep the supporting member 34, spring 35 and collar 31d' in tight engagement.

37 indicates a bar extending between each side plate 2a and side wall of the adjacent channel element 2b and welded thereto and the end plate 3. The bar 37 is formed with a screw threaded opening in which a threaded bolt 37a is mounted and locked in adjusted position by a nut 37b, the head of the bolt serving as a stop to limit undue movement of the frame 1 relative to the adjacent standard 7.

It will be observed that in both operating connections 30 and 31, the compression springs 33, 35, therefor, respectively, are disposed outwardly of the abutments which compress them when the connections are operated to apply the brake shoes 28; accordingly, the operation of either connections does not affect the other connections; that is, when the connections 31 are operated to apply the brake shoes 28, the rod 30b is free to move relative to the link 30e and when the connections 30 are operated (which are operated manually) the rods 31a are free to move except for the light resistance or tension of the springs 36a.

As will be observed, the brake shoes 28 and operating connections 31 therefor serve as a service brake mechanism. For example, in translating the truck from place to place, the operative pulling or pushing it may tilt the truck frame and engage the standards with the ground or other surface and thus cause a braking action on the wheels 6 to slow down or stop the movement of the truck. Due to the weight of the load intended to be carried, such mechanism is highly advantageous especially when the truck is being pushed or pulled down an inclined surface; in either case, the operative is not only relieved of undue effort but can readily control the movement of the truck and avoid unforeseen accidents.

The opposite ends of the frame 1 are provided with pairs of fixed handles 3x which facilitate handling of the frames when it is found undesirable to mount the handles 18 in position.

38 indicates as an entirety means arranged at each end of the frame 1 for clamping a load thereon. The means 38 at each end of the frame preferably consist of a chain 38a connected at one end to a rod 39 slidably extending through the base portion of a U-clip 39a, the legs of which are pivotally mounted on lugs fixed to the adjacent tubular member 2c. Between a collar 40 on the outer end of the rod 39 and the base portion of the U-clip 39a is a compression spring 41, which is put under tension when the other or free end portion of the chain is anchored, to yieldingly hold the load on the frame 1. The anchor for the free end portion of each chain 38a consists of a plate 42 rotatably mounted on a lever 43, which in turn is pivotally supported on a link 44. The link 44 is pivotally mounted on the adjacent tubular member 2c so as to form a connection for the chain when applied to different sized bodies (bombs or torpedoes). The plate 42 is provided at its opposite ends with pairs of spaced hook elements 42a, so that when the chain is laid over the body loaded on the frame 1 and put under the tension of the spring 41, one link of the chain is positioned between the lugs of either pair and the adjacent rearward link is engaged with their inner walls. As the pivot for the plate 42 is positioned nearer one end thereof than its other end, it may be rotated to position either pair of lugs 42a adjacent the frame 1 so as to be related to those links of the chain which are to be connected to the lugs. The lever 43 is provided with an eccentric or cam portion 43a. When the free end portion of the chain 38a is to be anchored, the lever 43 is swung outwardly (see dotted lines in Fig. 1), then the chain is stretched over the body on the frame 1 and connected to one pair of lugs 42a under tension of the spring, and then the lever 43 is operated to engage its cam portion 43a with the off-set wall 44a of the link 44, the effect of which is to put the spring 41 under greater tension to insure binding of the body on the frame 1.

From the foregoing description it will be observed that I provide for mounting two spaced handles 18, so that the operative may walk between them and readily employ both hands to grip them; also, that the handles may be mounted on or at either end of the truck to facilitate the mounting thereof when the truck is so parked that one end thereof only is accessible. This arrangement is also advantageous since two handles may be mounted at each end of the truck, when the weight of the load or the surface over which the truck is to be translated is rough or so inclined as to require the effort of two operatives. Due to the fact that the truck wheels are mounted on the frame adjacent one end thereof and the standards 7 are mounted adjacent its other end, whereby the frame 1 tends to tilt in one direction and as the standards are operatively connected to the brake mechanism, the latter is automatically operated in the event the operative releases his grip on the handles. As already pointed out, the operative may tilt the truck during translation thereof to apply the brake mechanism, whereby it may operate as a service brake. The manually operated connections for the brake shoes may be employed when the truck is to be parked and/or to hold it against movement with the frame 1 in load carrying position when it is found desirable for any reason for the operative to hold the frame in this position.

To those skilled in the art to which my invention relates many changes in construction and widely differing embodiments and applications of the invention will be apparent without departing from the spirit and scope thereof. My disclosures and the description herein are purely illustrative and not intended to be in any sense limiting.

What I claim is:

1. In a truck, the combination of a frame, a pair of wheels for supporting said frame, a handle connected to one end of said frame for wheeling and tilting said frame, a brake shoe movably supported on said frame and adapted to removably engage one of said wheels, and means responsive to the tilting of said frame in one direction for applying said mechanism to said wheels, consisting of a device swingably supported at one end on and adjacent one end of said frame, the opposite end of said device being arranged to engage the ground or other surface when the frame is tilted in one direction, whereby said frame moves relative to said device, and connections connected to said brake shoe and said device and operated by the latter during movement of said frame relative to said device to effect engagement of said shoe with the adjacent wheel.

2. A truck as claimed in claim 1 wherein said connections include a spring arranged to release said brake shoe from the adjacent wheel when the device disengages the ground or other surface due to tilting of the frame in the opposite direction.

3. A truck as claimed in claim 2, wherein are provided on said frame manually operable means for operating said brake shoe independently of said connections.

4. In a truck, the combination of a frame, a pair of wheels for supporting said frame and rotatable about a transverse axis, a brake shoe movably supported on said frame and adapted to removably engage one of said wheels, a standard mounted at one end on said frame adjacent one end thereof, the opposite end of said standard being arranged to engage the ground or other surface and move inwardly relative to said frame when said end thereof is tilted downwardly, means for limiting the downward movement of said standard relative to said frame when the latter is in load transporting position, and means between and connected to said brake shoe and said standard and arranged to be operated by the latter to engage said brake shoe with the adjacent wheel when said standard moves inwardly relative to said frame due to tilting of the adjacent end of said frame downwardly.

5. In a truck, the combination of a frame, a pair of wheels for supporting said frame and rotatable about a transverse axis, a brake shoe movably mounted on said frame and adapted to removably engage one of said wheels, a standard adjacent one end of said frame and consisting of a horizontal arm pivotally mounted on said frame and a vertical leg depending from said arm at a point remote from said pivotal mounting and arranged to engage the ground or other surface when the adjacent end of said frame is tilted downwardly, means co-operating with the pivot for said standard for supporting the latter on said frame when the latter is in load carrying position and during the initial tilting movement thereof, the engagement of said leg with the ground or other surface serving to stop the movement of said standard with the frame as tilting movement of said frame is continued, whereby said frame moves relative to said standard, and connections between and connected to said standard and said brake shoe and arranged to operate the latter into engagement with the adjacent wheel as movement of said frame relative to said standard takes place.

6. A truck as claimed in claim 5 wherein is provided on the truck frame manually operable means connected to said brake shoe for moving it into engagement with the adjacent wheel independently of said brake shoe operating connections.

7. In a truck, the combination of a frame, a pair of wheels for supporting said frame and rotatable about a transverse axis, a brake mechanism on said frame for said wheels comprising a brake shoe movably supported on said frame and arranged to removably engage one of said wheels, an operating device for said shoe provided with an abutment, a standard adjacent one end of said frame and consisting of a horizontal arm pivotally mounted at one end on said frame and a depending leg spaced from the pivotal mounting for said arm and arranged to engage the ground or other surface when the adjacent end of said frame is tilted downwardly, means co-operating with the pivot for said arm for supporting the latter on said frame when the latter is in load carrying position and during the initial tilting movement thereof, the engagement of said leg with the ground or other surface serving to stop the movement of said standard with said frame as tilting movement of said frame is continued, whereby said frame moves relative to said standard, a spring one end of which is engaged with said abutment, and an element on the arm of said standard spaced from the pivotal mounting therefor and engaged with the opposite end of said spring and operable through the latter to operate said shoe operating device as movement of said frame relative to said standard takes place.

8. A wheel mounted truck comprising a frame, a transversely arranged axle for the truck wheels supported on the frame adjacent one end thereof, a cross rod provided with brake shoes arranged to engage and disengage the wheels of the truck, longitudinally extending rods at either side of said frame connected to said cross rod, a pair of standards adjacent the opposite end of said frame, each standard consisting of an arm pivotally mounted at its inner end on said frame and a depending leg at its outer end, means on said frame engaging a portion of each standard for limiting its downward movement relative thereto, an abutment fixed to each arm and through which one of said longitudinally extending rods projects, an abutment on the projected end of each rod, and a compression spring disposed between each first mentioned abutment and the adjacent abutment, said standards being arranged to engage the ground during tilting of said frame, whereby the latter moves relative to the arms of said standards and the abutments on said arms transmit motion through said springs to said rods to apply said brake shoes to the truck wheels.

9. In a truck, the combination of a frame having a transversely arranged axle, wheels on said axle, brake shoes arranged to engage and disengage said wheels, a swingably mounted cross member for supporting said shoes, rods connected at corresponding ends to said cross member, an abutment fixedly mounted on the opposite end of each of said rods, a separate abutment through which each of said rods slidably extends spaced from the adjacent fixedly mounted abutment, a compression spring on each of said rods disposed between and engaging the fixedly mounted and separate abutments thereon, manually operated means operatively connected to said separate abutments and arranged to move the latter and compress the adjacent spring and through said adjacent fixedly mounted abutment and the adjacent rod operate said brake shoes into engagement with said wheels, and means responsive to the tilting of said frame for operating the other separate abutment to compress the adjacent spring and through the adjacent fixedly mounted abutment and the adjacent rod to operate said brake shoes into engagement with said wheels.

PAUL E. HAWKINS.

REFERENCES CITED

The following references are of record in the file of this patent:

UNITED STATES PATENTS

| Number | Name | Date |
| --- | --- | --- |
| 149,404 | Jardine | Apr. 7, 1874 |
| 332,482 | Briggs | Dec. 15, 1885 |
| 374,950 | Elliott | Dec. 20, 1887 |
| 685,240 | Allen et al. | Oct. 29, 1901 |
| 1,015,966 | Larson | Jan. 30, 1912 |
| 1,119,068 | Compton et al. | Dec. 1, 1914 |
| 1,261,974 | Thompson | Apr. 9, 1918 |
| 1,582,644 | Bastien | Apr. 7, 1925 |
| 1,831,026 | Nessan | Nov. 10, 1931 |

FOREIGN PATENTS

| Number | Country | Date |
| --- | --- | --- |
| 203,571 | Switzerland | June 16, 1939 |